United States Patent [19]

King

[11] Patent Number: 4,603,842

[45] **Date of Patent: * Aug. 5, 1986**

[54] METHOD OF SLIDING GATE VALVE OPERATION

[75] Inventor: Patrick D. King, Rantoul, Ill.

[73] Assignee: Flo-Con Systems, Inc., Champaign, Ill.

[ * ] Notice: The portion of the term of this patent subsequent to Feb. 18, 2003 has been disclaimed.

[21] Appl. No.: 734,493

[22] Filed: May 16, 1985

Related U.S. Application Data

[62] Division of Ser. No. 602,828, Apr. 23, 1984.

[51] Int. Cl.[4] .............................................. F16K 51/00

[52] U.S. Cl. ...................................... 266/44; 266/236; 222/600; 222/590

[58] Field of Search ................. 266/236, 287, 271, 44; 222/600, 590, 591

[56] References Cited

U.S. PATENT DOCUMENTS

| | | | |
|---|---|---|---|
| 3,765,572 | 10/1973 | Neumann et al. | 222/600 |
| 4,269,399 | 5/1981 | Tinnes et al. | 266/236 |
| 4,474,362 | 10/1984 | King | 266/236 |

*Primary Examiner*—L. Dewayne Rutledge
*Assistant Examiner*—S. Kastler
*Attorney, Agent, or Firm*—Jack E. Dominik

[57] ABSTRACT

Disclosed is a sliding gate valve employed on the side of a furnace as a furnace valve, in which the mechanism is so structured that the shut off occurs by directing the slide gate to the up position rather than the down position. In addition, to facilitate a reduction in space at the slide gate, the slide gate is desirably configured to be asymmetrical, with the short end extending upwardly from the pour opening in the nozzle. A refractory lined heat shield protects the sliding gate carrier and also serves to mount a collector extension when used. More specifically, the slide gate is provided with a metallic frame which retains a monolithic refractory into which errosion resistant refractory inserts or preformed members are cast. Means are desirably provided to remove the spent refractory for remanufacture thereby reclaiming the casting. Similarly in the top plate, means are provided for remanufacture and for facilitating proper orientation of errosion-resistant refractory inserts such as zirconium oxide in the manufacture of the stationary plate. The top plate is symmetrical to provide full travel pressure face relationship with the sliding gate. Both the stationary plate and slide gate casting have spring pad back up reinforcements. The top plate desirably has means for securing a well nozzle to it.

7 Claims, 23 Drawing Figures

METHOD OF SLIDING GATE VALVE OPERATION

This is a division of application Ser. No. 602,828, filed Apr. 23, 1984.

BACKGROUND OF THE INVENTION

1. Field of Invention

The present invention is directed to a sliding gate valve having particular application for use as a furnace valve in which the pouring orifice is substantially horizontal. The invention is also directed to the method of operating the valve to close in the up position of the slide gate. Also the invention is directed to remanufacturable sliding gate members and top plate members.

2. Summary of the Prior Art

The prior art is exemplified by Shapland U.S. Pat. No. 4,063,668 issued December 1977 and also patents of Metacon A. G. U.S. Pat. Nos. 4,269,399 and 4,273,315.

As to the Shapland U.S. Pat. No. 4,063,668 it should be noted that it utilizes bilaterally symmetrical slide gates and top plates. While the use on a bottom pour vessel such as a ladle, where there is substantial clearance, has been highly satisfactory; when employed on the side of a furnace where extensive auxiliary equipment appears, space limitations can cause a problem.

Moreover, in the application of sliding gate valves of the aforementioned type, a particular undesirable wear phenomenon occurs. Specifically, it has been found that a depression pocket is generated by erosion forces in the wall of the opening through the fixed plate adjacent its sliding surface and limited to the region thereof that faces the direction of movement of the slide gate upon valve closure. Continued cycling of the valve by moving the slide gate between its open and closed positions increases the effects of these erosion forces causing an enlargement of the depression. Such erosion can be accommodated in a bottom pour vessel as shown in FIGS. 1-13 inclusive of U.S. Pat. No. 4,063,668. However, the presence of such a pocket in a vertically disposed valve, as on the sidewall of a metal processing furnace, requires consideration. For example, U.S. Pat. Nos. 4,269,399 and 4,273,315 disclose sliding gate valve arrangements that utilize a slide gate which closes the valve as the gate is moved downwardly. This has the distinct disadvantage that the erosion pocket occurs in the wall of the stationary plate and faces upwardly. The pocket, therefore, provides a receptacle in which slag or metal may collect and solidify. The solidification of this collected metal and slag not only creates abrasion of the refractory parts but can accumulate to an amount that causes the plates to be displaced from one another whereby molten metal can leak into the space created between the plates. When this occurs the valve is rendered inoperative until the refractory plates can be replaced.

Furthermore, with the valves which close in the down position, upon opening the metal cascades frgm an upper position to a lower position on the pour nozzle causing a free-fall area which initially creates a turbulence and additional errosion potential adjacent the portion of the nozzle which slides against the stationary plate. This condition can be agravated when throttling.

Accordingly it becomes desirable to develop a furnace valve which minimizes space, minimizes the potential of a pocket where slag or metal can collect in the off position, and to provide for activating the pouring with a direct connection between the furnace opening and stationary plate and the bottom portion of the pouring nozzle which communicates with either a trough or directly to a ladle.

SUMMARY OF THE INVENTION

The present invention is directed to a sliding gate valve employed on the side of a furnace as a furnace valve, in which the mechanism is so structured that the shut off occurs by directing the slide gate to the up position rather than the down position. In addition, to facilitate a reduction in space at the slide gate, the slide gate is desirably configured to be asymmetrical, with the short end extending upwardly from the pour opening in the nozzle. A refractory lined heat shield protects the sliding gate carrier and also serves to mount a collector extension when used. More specifically, the slide gate is provided with a metaliic frame which retains a monolithic refractory into which errosion resistant refractory inserts or preformed members are cast. Means are desirably provided to remove the spent refractory for remanufacture thereby reclaiming the casting. Similarly in the top plate, means are provided for remanufacture and for facilitating proper orientation of errosion-resistant refractory inserts such as zirconium oxide in the manufacture of the stationary plate. The top plate is symmetrical to provide full travel pressure face relationship with the sliding gate. Both the stationary plate and slide gate casting have spring pad back up reinforcements. The top plate desirably has means for securing a well nozzle to it.

In view of the foregoing it is a principal object of the present invention to provide a method of operating a furnace valve and structure for the same in which shutoff occurs with the sliding member in the up position. A correlative objective of the invention is to proyide such a valve in which the initial flow of metal is directly on to the surface of the pour nozzle thereby eliminating initiating the pour with a cascading of molten metal onto the refractory bore of the sliding gate.

Yet another object of the present invention is to provide a furnace valve with an asymmetrical sliding gate in which space limitations are reduced, and in which this particularly occurs at the low end of the valve.

Yet another important objective of the present invention is to provide a furnace valve with a stationary plate and a sliding gate which can be remanufactured without destroying the machined housings for the respective stationary plate and sliding gate. A further objective is achieved by providing for mounting the well nozzle to the top plate before insertion into the tap hole block.

BRIEF DESCRIPTION OF THE DRAWINGS

Further objects and advantages of the present invention will become apparent as the following description proceeds, taken in conjunction with the accompanying illustrative drawings, in which.

DESCRIPTION OF THE PREFERRED EMBODIMENTS

Valve Assembly

Figures 1, 1A:
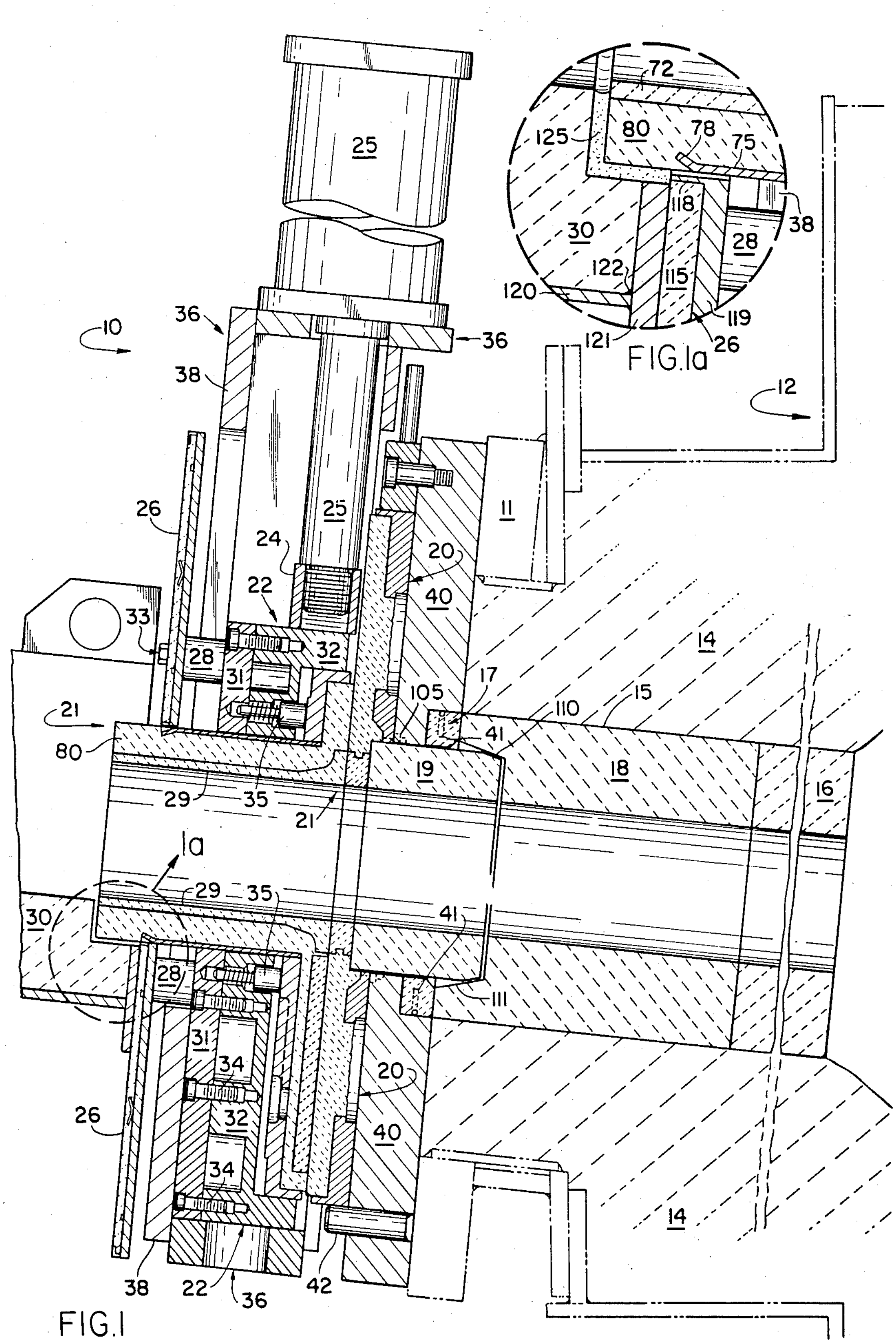
FIG. 1 is a transverse sectional view of a furnace with a valve installed illustrative of the present invention.
FIG. 1*a* is an enlarged sectional view taken from location 1*a* on FIG. 1 and showing the relationship between the end of the collector and the pour tube.

As shown in FIG. 1, the furnace valve 10 is secured by means of an adapter 11 to a furnace 12. The furnace 12 is typically used for the preparation of steel which is to be tapped into a ladle, and transferred elsewhere in the steel mill for further processing.

Interiorly of the furnace 12 a refractory lining 14 is provided. At a side wall portion of the furnace 12, provision is made for a well 15 for tapping the steel from the furnace after it has been smelted and otherwise processed. The well 15 includes an inner octagonal or hexagonal tap hole block 16, and an outer octagonal or hexagonal tap hole block 18. Both the inner tap hole block 16 and outer tap hole block 18 are shown here as having a hexagonal cross-section, but other locking type exterior faces may be used.

A tap hole well nozzle 19 is in open communication with the inner tap hole block 16 and outer tap hole block 18 and couples directly to a stationary plate 20. The stationary plate 20 is in pressure opposed relationship to a slide gate 21 which, in turn, is held by a slide gate carrier 22 to reciprocate in sliding relationship with the stationary plate 20.

A carrier connector 24 is provided on the slide gate carrier 22, and is coupled to a carrier drive 25 for reciprocating the slide gate carrier 22 and the slide gate 21. To be noted is a carrier heat shield 26 secured to shield mount 28, the carrier heat shield 26 being in surrounding relationship with the collector 29 of the slide gate 21.

The slide gate collector 29 is optionally coupled to an extension 30 by means of the interposed heat shield 26 for extending the pour path of the molten metal being tapped from the furnace 12 secured by means of shield bolts 33. Interiorly of the slide gate carrier 22 are a plurality of carrier spring pads 35 which directly engage the underneath portion of the slide gate 21 and provide a pressure face-to-face relationship between the slide gate 21 and the stationary plate 20. The carrier bottom 31 and carrier top 32 contain the spring pads 35. The foregoing elements are secured within a frame assembly 36, which includes the frame bottom 38 and the mounting plate 40. The mounting plate 40, in turn, is eecured to the adapter.

Figure 2L:
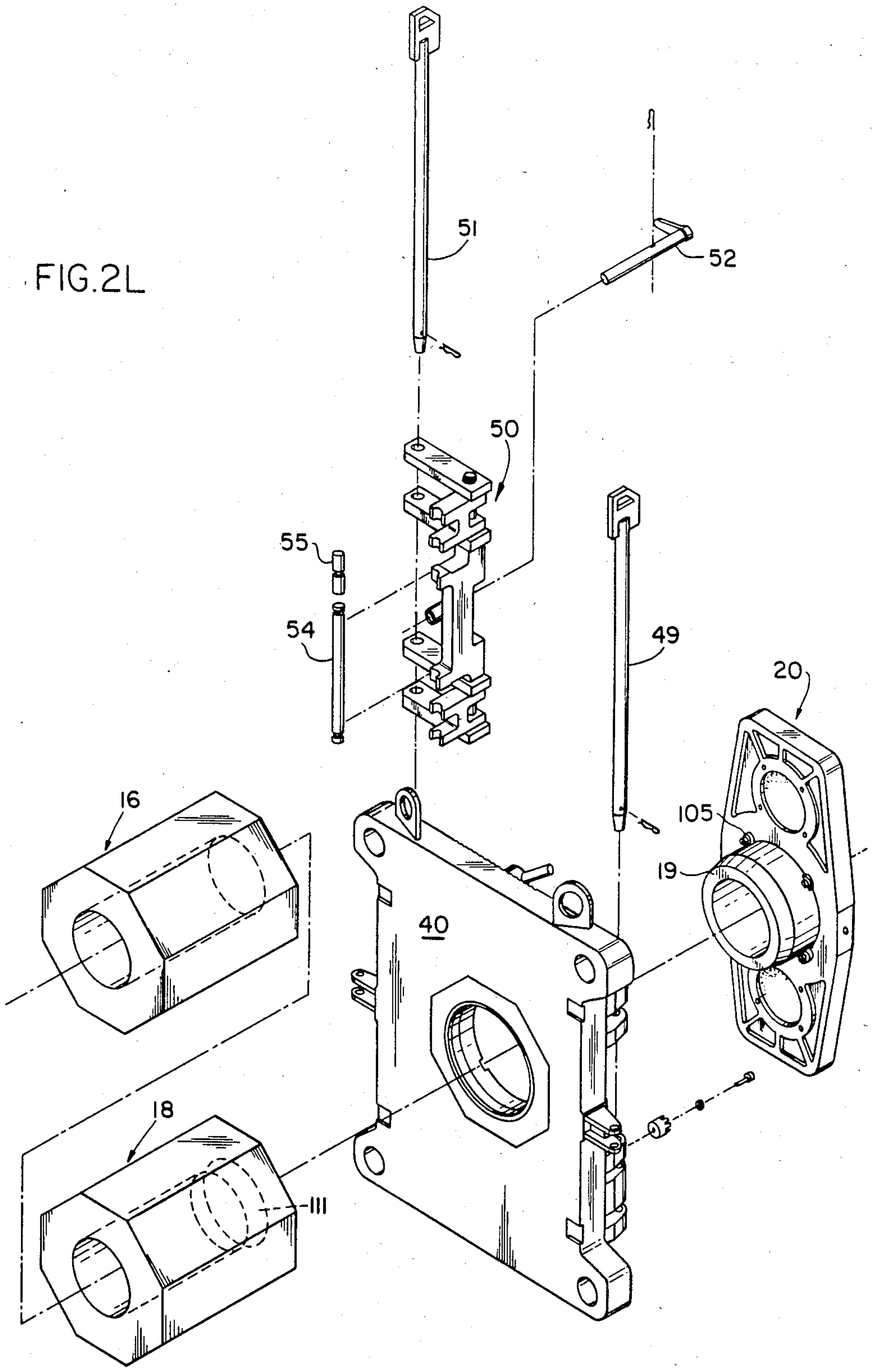
FIGS. 2L and 2R are a composite exploded view of the subject valve with 2L representing the left-hand portion of the illustration and 2R representing the right-hand portion of the illustration.
Figure 2R:
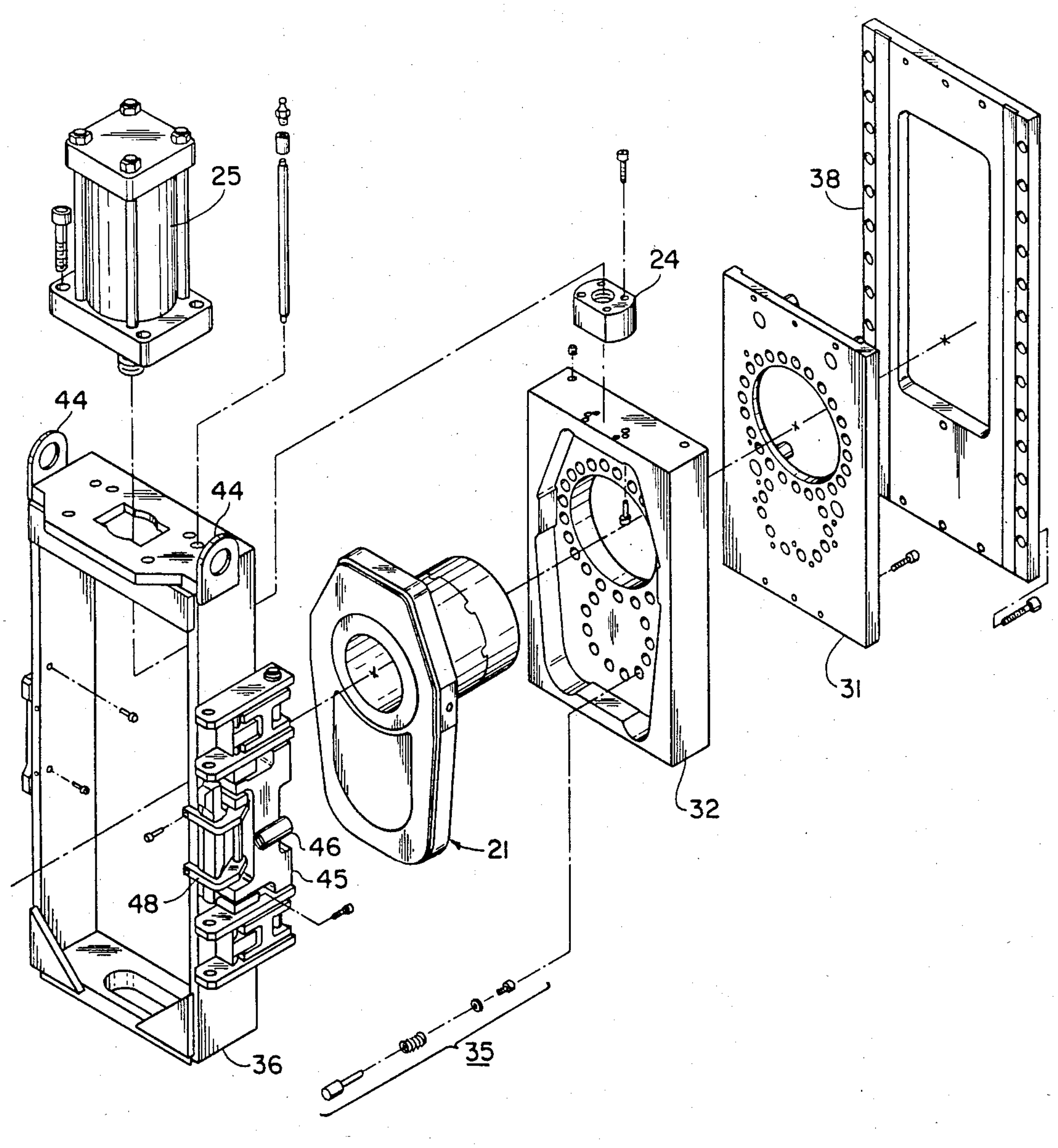

Turning now to FIGS. 2L and 2R, the furnace valve will be described in greater detail, and the detailed parts shown in their disassembled but related relationship to the various components of the furnace valve 10. Proceeding generally from left to right, it will be seen that the inner tap hole block 16 and outer tap hole block 18 are positioned to provide for fluid flow to the well nozzle 19. The mounting plate 40, as mentioned earlier, is secured to the adapter 11.

As noted in FIG. 1, a monolithic section 17 is cast into the counterbore on the back of the mounting plate 40. Anchors 41 are employed to secure the same in place. The mounting plate monolith 17 thus provides for a positive refractory-to-refractory butt joint with the end of the outer tap hole block 18. The tapers 110, 111 are secured with mortar pressed in place when the mounting plate 40 is secured to the adapter 11. Thus a full refractory-to-refractory joint is present to inhibit penetration of the joint between the three elements, the outer tap hole block 18, the replaceable nozzle 19, and the mounting plate 40. Furthermore the mounting plate 40 forms a zero clearance seal to the adapter plate refractory. The frame assembly 36 is provided with a pair of lifting eyes 44 which permit the entire valve to be removed from the adapter 11 and replaced as a preassembled unit. Upon any such removal, the face of the mounting plate monolith 17 can be inspected, and patched or otherwise maintained. Alternatively, a hinge assembly 45 (see FIG. 2R) and latch assembly 50 (see FIG. 2L) are provided for those installations where the refractory is to be replaced and the valve serviced without removing the same from the furnace. The hinge assembly 45 is secured to the frame 36, and provided with a hinge activator sleeve 46 into which a hinge rod may be inserted. The hinge retainer 48 is on the frame 36, and the hinge assembly is secured by means of hinge pin 49.

The latch assembly 50, shown primarily in FIG. 2L, is secured by means of the latch hinge pin 51 to the frame 36 and then inactivated by means of latch lock assembly 52. Latch pivot pin 54 and its associated latch stub pin 55 complete the assembly of the latch. As described earlier, when the hinge assembly 45 and latch assembly 50 are in place, the carrier bottom 31 and the carrier top 32 retain the carrier spring pads 35 to engage the sliding gate 21. The stationary plate 20 is sandwiched between the sliding gate 21 and the inner portion of the mounting plate 40 and the well block nozzle 19 nest within the center of the stationary plate 20 as will be explained in greater detail where those parts are described separately.

Slide Gate Assembly

Figure 6:
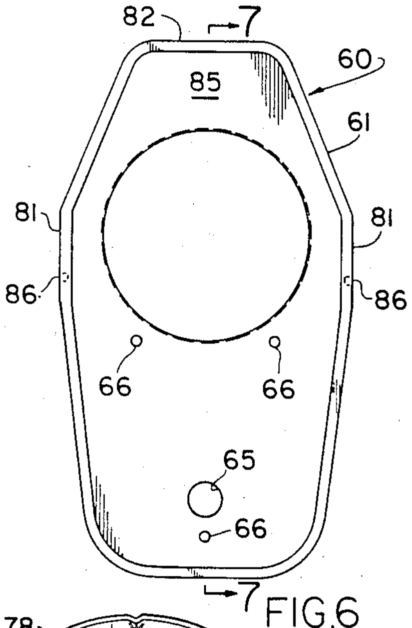
FIG. 6 is an elevational view of the casting for the slide gate showing the upstream face.
Figure 7:
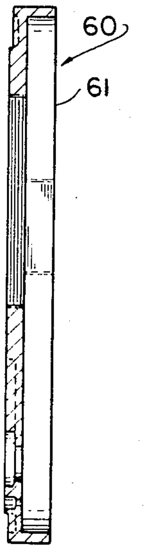
FIG. 7 is a transverse sectional view of the slide gate casting taken along section line 7—7 of FIG. 6.
Figure 8:
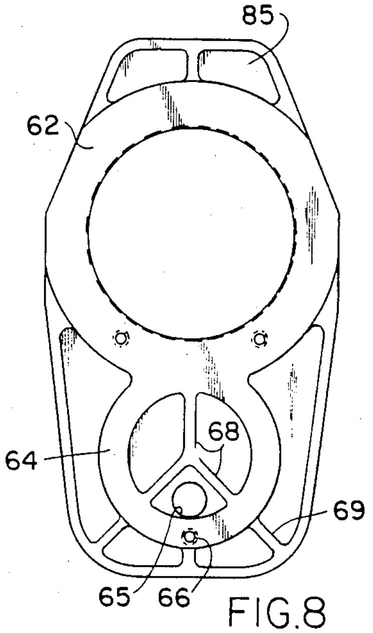
FIG. 8 is an elevational view of the slide gate casting showing the downstream face.
Figure 9:
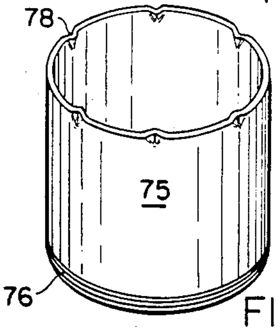
FIG. 9 is a perspective view of the collector tube.

The slide gate assembly is shown in FIGS. 3–11. There it will be seen that a slide gate frame casting 60 having an outer skirt 61 and a collector pad ring 62 receive and mount the slide gate collector 29. As shown in FIG. 8, an insert pad ring 64 is provided in the slide gate frame casting 60 and centraly thereof provision is made for a knock-out hole 65. A casting spacer mount 66 is machined into the insert pad ring 64 to facilitate orientation during casting of the monolithic material which embeds the slide gate collector 29 and the insert 70. Inner ribs 68 and outer ribs 69 are provided interiorly of and adjacent to the insert pad ring 64 to give additional strength.

Figure 3:
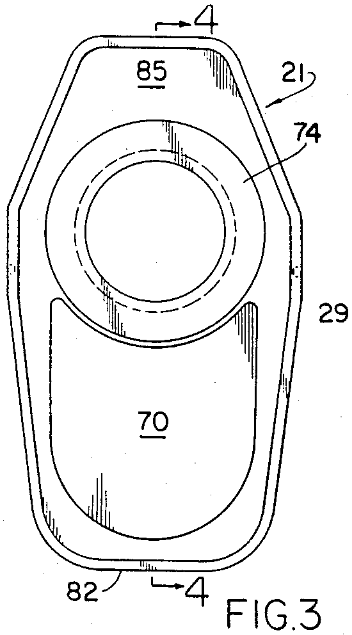
FIG. 3 is an elevational view of the sliding gate assembly upstream face.
Figure 4:
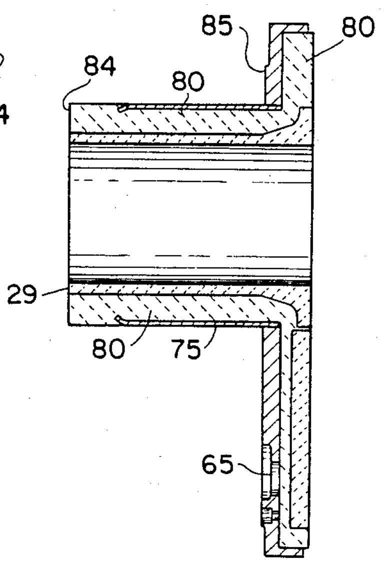
FIG. 4 is a transverse sectional view of the sliding gate assembly taken along section line 4—4 of FIG. 3 and in the same scale as FIG. 3.
Figure 5:
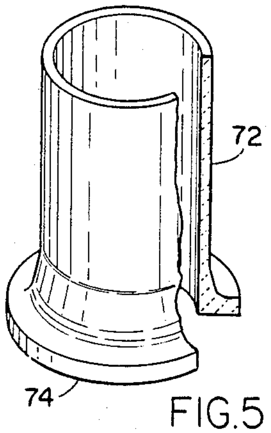
FIG. 5 is a perspective view of the slide gate collector insert.
Figure 10:
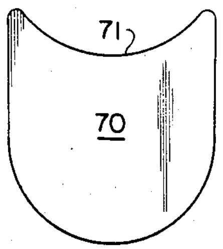
FIG. 10 is an elevational view of the slide gate refractory insert.
Figure 11:
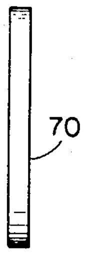
FIG. 11 is a side view of the slide gate refractory insert shown in FIG. 10.
Figure 12:
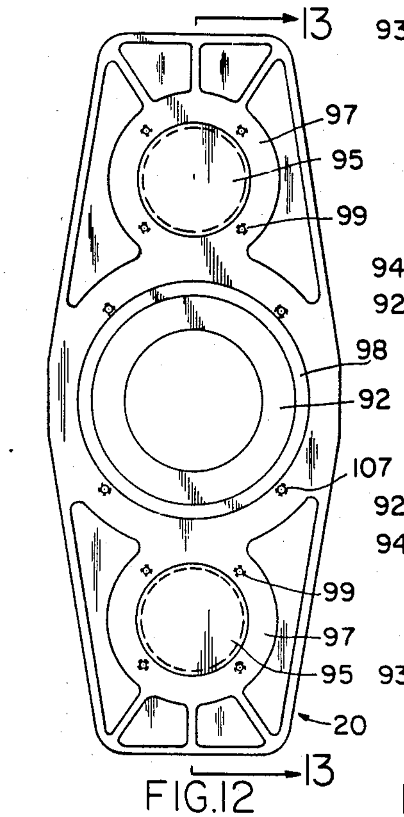
FIG. 12 is an upstream face view of the stationary plate assembly.

As shown in FIGS. 3 and 10, the insert 70 has a collector crotch 71 which engages the collector rim 72. The collector rim flat 74 and the insert 70 are coplanar and formed of a erosion and/or abrasion resistant material such as zirconium oxide or aluminum oxide since they are the elements which are in contact with molten metal. The collector tube 75 (see FIG. 9) is provided with threads 76 for threadedly engaging the slide gate frame casting 60. The detents or crimps 78 at the end of the collector tube 75 opposite the thread 76 lockingly engage the monolithic material 80 as best shown in FIG. 4. A portion of the monolithic material 80 extends forming a refractory collector end 84. That portion of the short end 85 of the sliding gate 21 presents a face of monolithic material which does not come in contact with the molten metal. Also to be noted are the side flats 81 and end flats 82 of the slide gate frame casting 60. Optionally lifting holes 86 are bored in the side flats 81.

Stationary Plate

The stationary plate is shown in FIGS. 12–17 inclusive. The stationary plate 20 is symmetrical, even though the sliding gate 21 is asymmetrical. As will be appreciated from the reinforcing construction of the stationary plate 90, it is provided to give full support to the pressure from the carrier spring pads 35 in all positions of travel of the slide gate 21 and the slide gate carrier 22. The stationary plate frame 90 is provided with a skirt 91. Centrally the stationary plate orifice insert 92 with its insert lock groove 94 is positioned for interlocking casting within the frame 90. Knockout holes 95 are provided at opposed positions in the frame 90, and each has a monolithic lock ring 96.

A well block nozzle stepped seat 98 is provided centrally of the stationary plate 90, and terminates in one face of the stationary plate orifice insert 92. Threaded bores 99 are provided in the reinforcing rings 97 which surround the knockout holes 95. The bores 99 are threaded to receive funnels useful in casting the monolithic refractory 93 into the stationary plate 20.

Figure 13:
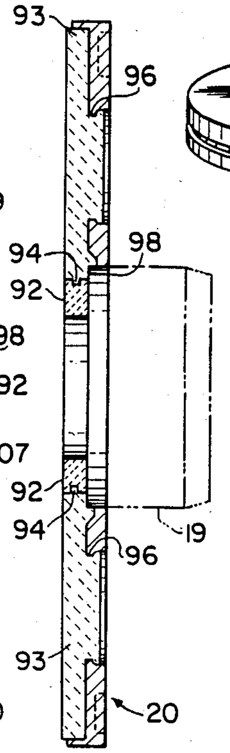
FIG. 13 is a transverse sectional view of the stationary plate taken along section line 13—13 of FIG. 12.
Figure 17:
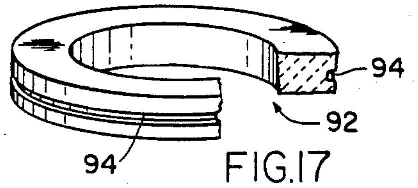
FIG. 17 is a perspective view of the stationary plate insert drawn to an enlarged scale.
Figure 18:
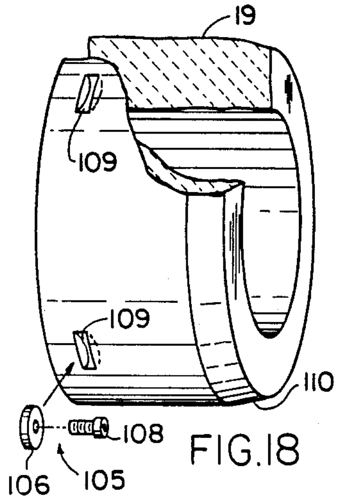
FIG. 18 is a perspective sectional view of the well nozzle drawn to a larger scale.
Figure 14:
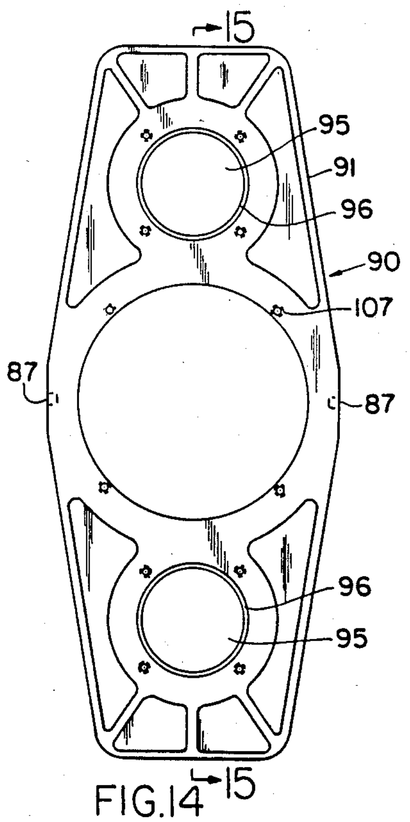
FIG. 14 is an upstream face view of the stationary plate frame only.
Figure 15:
FIG. 15 is a transverse sectional view of the stationary plate frame taken along section line 15—15 of FIG. 14.
Figure 16:
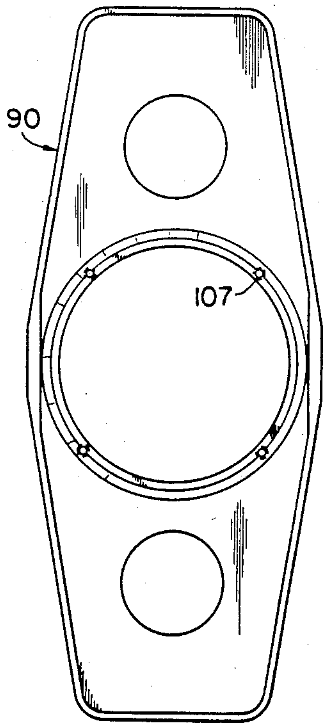
FIG. 16 is a downstream face view of the stationary plate frame only.
Figure 21:
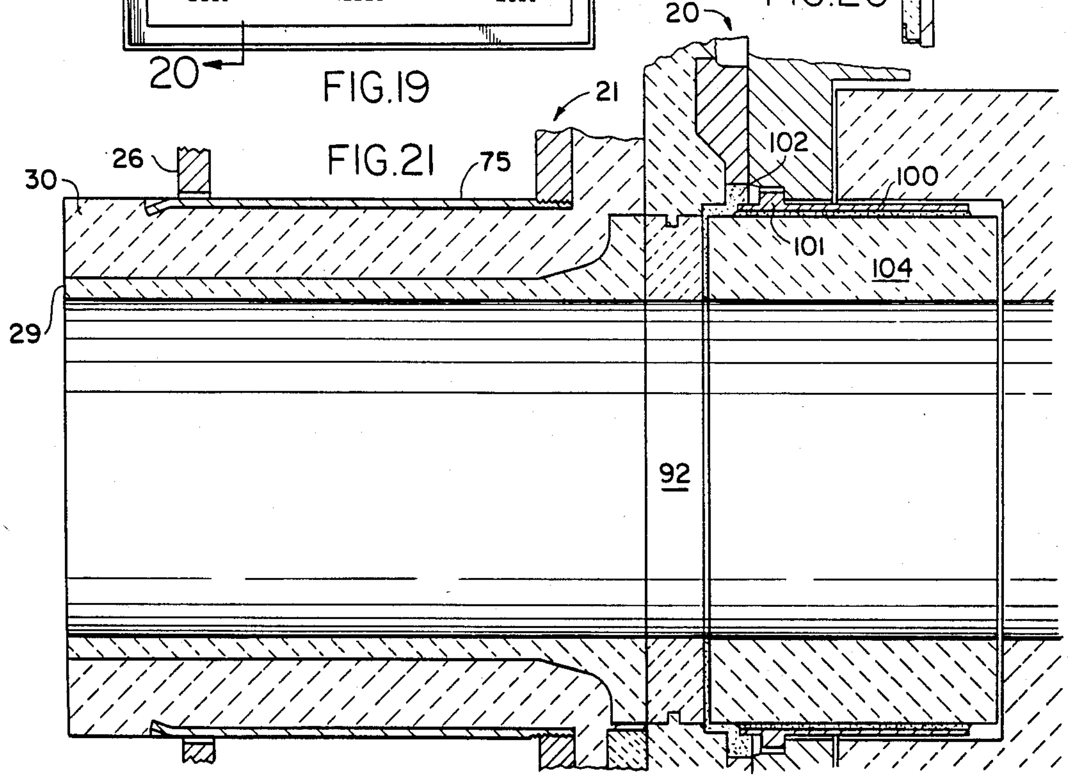
FIG. 21 is a detail section of the valve orifice similar to FIG. 1 drawn to a larger scale showing an alternative construction well nozzle.

As shown particularly in FIGS. 13 and 18, a preferred construction of well nozzle 19 is provided which rests atop the well nozzle seat 98 within the stationary plate frame 90. A locking assembly 105 is provided to secure the well nozzle 19 to the stationary plate 20. More specifically a clamp washer 106 is sccured by means of mount threads 107 in the stationary plate 90 through the medium of the washer mount screw 108. The washer 106 then is secured into the crescent-shaped washer lock 109 in the refractory of the well nozzle 19. Once this locking has taken place, the taper 110 on the block nozzle 19 is secured in mating engagement with a mating taper 111 (see FIG. 1) in the outer tap hole block 18 secured within the refractory 14 of the furnace 12. The alternative construction of the well nozzle 19 is shown in FIG. 21, where the refractory 104 is encased within a well nozzle frame 100, and includes a well nozzle ring 101 which is lockingly engaged with the mounting plate, and secured in position by means of the well nozzle mortar 102, again as shown in FIG. 21. As shown in FIG. 1, the top plate is secured in place by top plate retaining pins 42.

The Heat Shield and Nozzle Extension

Figure 19:
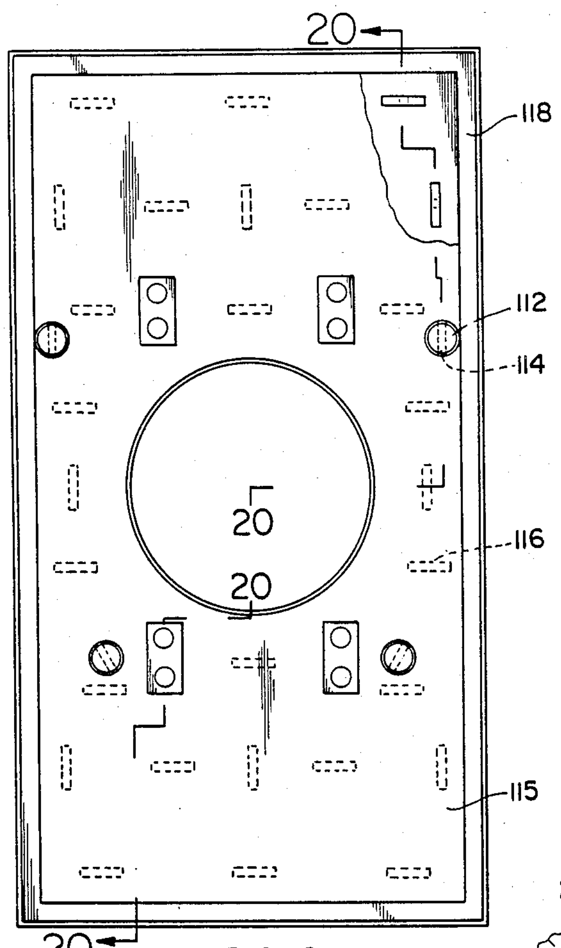
FIG. 19 is an downstream face view of the heat shield assembly.
Figure 20:
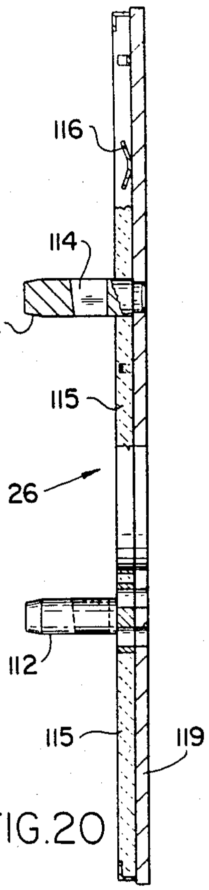
FIG. 20 is a transverse sectional view of the built-up heat shield taken along section line 20—20 of FIG. 19.

The heat shield 26 is shown in FIGS. 19 and 20. There it will be seen that an extension mount 112 extends from the heat shield, and includes mounting pin slots 114 to receive the nozzle extension 30 and secure the same to the heat shield, and more particularly against the monolithic refractory 115 which is cast into the heat shield, and held in place by the combined action of the V-locks 116 and the rim 118 surrounding the heat shield base plate 119. A unique advantage achieved by the refractory lined heat shield 26 becomes more apparent from the structure as shown in FIG. 1*a*. The nozzle extension 30 has its refractory lining held in place by means of the nozzle extension frame 120, normally formed from a rolled sheet of metal. The frame 120 is welded to a semi-circular nozzle extension frame mounting flange 121 at the joint 122. When the nozzle extension 30 is secured to the heat shield 26 as described above, provision is made for mortar 125 to seal the end of the monolithic refractory material 80 of the collector to the nozzle extension 30 in a refractory to refractory relationship. The nozzle extension frame mounting flange 121 is secured against the heat shield monolith 115 in a metal to refractory relationship. By utilizing this construction, there is no metal to metal relationship in the path of any leakage of molten metal should it errode the mortar 125 bonding the collector monolith 80 to the nozzle extension 30. Experience has shown that where there is a metal to metal bond, and any leakage or errosion occurs, it will accelerate rapidly; whereas if the bond is refractory to refractory, or even refractory to metal, this tendency of the molten metal to leak or burn its own path is minimized. Thus the relationship between the heat shield 26 and the nozzle extension 30 has been enhanced by this construction to permit flexibility of mounting, and in addition, security against break out.

Remanufacture

As the stationary plates 20 and slide gates 21 are worn, they may be remanufactured and their respective frames reclaimed. As shown in FIG. 4 primarily, a mandrel or press can engage the monolithic collector end 84, while at the same time a mandrel is inserted in the knockout hole 65. The combined pressure removes the collector insert 29 and the face insert 70. Thereafter by tapping or shaking, the balance of the monolithic cast material 80 may be removed.

Similarly, when the stationary plate 21 is to be remanufactured, mandrels are provided to press on the knockout holes 95 at the same time a central mandrel engages the stationary plate orifice insert 92.

The casting spacer mount 66 of the sliding gate 21 as shown in FIGS. 6 and 7 permits the insertion of a spacer to support the insert 70. The four concentric spacer bores 99 in the top plate frame 90 are connected with a pouring spout and serve as sprews for the castable material. Lifting holes 87 may be optionally provided in the stationary plate in the same fashion as in the sliding gate.

Summary

As pointed out above, the furnace valve 10 as shown is modified by means of an adapter 11 to accommodate a furnace 12 in which the side tap is at an angle to the vertical. Lifting eyes 44 are provided on the frame assembly 36 so that the entire valve 10 can be removed. In cases where the valves 10 are to be always removed in their entirety, the hinge assembly 45 and the latch assembly 50 may be modified and simplified to a simple clamp. In the valve 10 as shown, however, the hinge assembly 45 and latch assembly 50 are shown to illustrate that the valve can be used in either mode when the refractory is replaced while the valve 10 is on the furnace 12, or in the event it is removed.

Although particular embodiments of the invention have been shown and described in full here, there is no intention to thereby limit the invention to the details of such embodiments. On the contrary, the intention is to cover all modifications, alternatives, embodiments, usages and equivalents as fall within the spirit and scope of the present invention, specification, and appended claims.

What is claimed is:

1. The method of operating a valve which is secured to the side portion of a container for molten metal, in which the valve has a stationary refractory surface having an orifice in open communication with and adjacent a tap opening in the furnace having a substantially horizontal axis, and in which a slide gate is movably mounted in a carrier having means for applying a pressure face to face relationship to the stationary plate, and in which an erosion pocket is formed between the slide gate and refractory surface at the respective closure edges of each in the direction of shut-off, comprising the steps of:

closing the slide gate by moving the same upwardly against the stationary plate, whereby said erosion pocket faces downwardly when the shut-off is completed permitting drainage of the erosion pocket wherein said refractory surface is a removable plate.

2. A valve for use with a vessel having a side tap with an axis on a substantially horizontal orientation on a side wall comprising, in combination, means for mounting said valve against the wall of the vessel having a side tap with an axis on substantially a horizontal orientation, a stationary refractory surface having an orifice in open communication with the slide tap of the vessel, a sliding gate having an orifice, the slide gate being positioned for opposed pressure relationship with the stationary refractory surface, said stationary surface and said slide gate, upon use, forming an erosion pocket at the respective closure edges of each in the direction of shut-off, means for securing the slide gate in pressure relationship to the stationary refractory surface, means for reciprocating the slide gate in substantially a vertical axis, means for opening and closing said slide gate so that the same is closed on the upstroke with the orifice of the slide gate above the orifice of the stationary refractory surface, whereby drainage is provided downwardly from said erosion pocket after closure.

3. In the valve of claim 2 above, said slide gate being asymmetrical, with the short portion of the slide gate being oriented above the orifice of the stationary plate.

4. In the valve of claim 2 above, said stationary plate and said sliding gate having metallic frames, each of said stationary plate and sliding gate having highly erosion resistant refractory inserts for communication with molten metal, and each of said stationary plate and sliding gate having a monlithic refractory supporting and embedding the erosion resistant refractory interiorly of the respective frames.

5. In the valve of claim 4 above, said stationary plate refractory insert having an undercut centrally disposed ring portion to lock the same within the monolithic refractory.

6. In the valve of claim 5 above, internal means for positioning the refractory inserts in the respective frames whereby the monolithic supporting refractory can be poured with internal spacing to orient the refractory inserts within the respective stationary plate and sliding gate.

7. A method of operating a sliding gate valve for controlling the flow of molten metal from a vessel having a generally transversely extending pour opening through a substantially upstanding wall thereof, said valve comprising a pair of orificed refractory plates disposed in a generally vertical attitude on the wall of said vessel including a stationary refractory plate having an orifice in open communication with said vessel pour opening, a movable, orificed refractory slide plate mounted within a carrier having means by urging the slide plate into pressure sealing face-to-face contact with the stationary plate and drive means for moving said slide plate with respect to said stationary plate for placing the orifices into and out of mutual registry for opening and closing the valve and wherein an erosion pocket is generated in the wall of the stationary plate orifice in the region facing the direction of movement of the slide plate upon closure comprising the steps of:

closing the valve by moving the slide plate in a vertically upward direction to move the orifices in the respective plates out of mutual registry, and opening the valve by moving the slide plate in a vertically downward direction to place said orifices in mutual registry, whereby the erosion pocket is generated in the downwardly facing region of the stationary plate orifice wall, and upon opening the valve molten metal intially contacts the upward facing region of the stationary plate orifice wall.

* * * * *